FIG. 1.

INVENTOR.
DAVID L. JACKSON
BY
Kenyon & Kenyon
ATTORNEYS

INVENTOR.
DAVID L. JACKSON
BY
ATTORNEYS

Fig. 14.

United States Patent Office 3,509,615
Patented May 5, 1970

3,509,615
FEEDING AND STAKING MACHINE FOR MAKING A CONNECTION
David L. Jackson, Doylestown, Pa., assignor to Thomas & Betts Corporation, a corporation of New Jersey
Filed June 26, 1967, Ser. No. 648,795
Int. Cl. H01r 43/04
U.S. Cl. 29—203                                25 Claims

ABSTRACT OF THE DISCLOSURE

The connectors are deposited in the rotary wheel at the rear of the machine and fed to the staking station at the front of the machine. The staking jaws come together to stake the connector on a pair of conductors by crimping the notched ends of the connector over the conductors. The index system indexes the rotary wheel in synchronism with the staking jaws to sequentially advance another connector into the staking station after a connection has been made with a previous connector.

---

The invention relates to a feeding and staking machine. More particularly, the invention relates to a feeding and staking machine and method for forming an electrical and mechanical connection between a pair of conductor wires and a connector. Still more particularly, the invention relates to a machine and method for making a solderless electrical and mechanical connection between a pair of conductor wires and a solderless connector.

Generally, the feeding and staking machine of the invention is constructed to segregate a series of solderless electrical connectors, such as the connectors described in copending U.S. patent application Ser. No. 555,745, filed June 7, 1966, abandoned in favor of continuation application, Ser. No. 792,225, filed Jan. 14, 1969, and to sequentially feed each connector into a staking station. The machine is further constructed to stake a pair of conductors within the confines of each connector so as to form an electrical and mechanical connection.

The connectors which are staked onto the conductors are fed to the machine through means of a magazine mounted to the rear of the machine. An index wheel is rotatably mounted within the machine and is formed with a series of peripheral grooves to receive the connectors from the magazine. As the index wheel rotates toward the front of the machine, each received connector is brought into the staking station while being positively held in a groove. The wheel remains stationary while a pair of conductor wires are inserted into receiving notches at the ends of the connector in the staking station and a pair of jaws are directed against the notched ends of the connector in opposition to each other. The jaws are shaped so as to stake or crimp the walls of each notch about a conductor wire so as to mechanically and electrically join the connector to each conductor. The connection of conductors and connector is then removed from the machine. The jaws are actuated in synchronism with the index wheel so that as the jaws are moved away from the formed connection at the staking station, the index wheel is rotated to bring the next connector into the staking station.

Since the connectors to be staked by the machine have a slot centrally of the notches, a mandrel is positioned within each groove of the wheel of the machine to project into the slot of a connector so as to maintain the contour of the slot during staking of the conductors to the connector. The mandrel is further used to positively position a connector in the staking station. This is accomplished by initially having the mandrel project into the connector slot upon deposition of the connector in a groove and by subsequently having the mandrel cammed outwardly of the index wheel during rotation of the index wheel toward the staking station. As the index wheel is brought into position adjacent the staking station, the mandrel moves the connector out of the groove so that the wheel cannot interfere with the reciprocating movements of the staking jaws. After the connection is formed and the index wheel continues to rotate, the mandrel is retracted into the index wheel to position another connector.

Accordingly, it is an object of the invention to provide a machine for staking a solderless connector onto an electrical conductor.

It is another object of the invention to make a solderless electrical connection between a connector and an electrical conductor.

It is another object of the invention to provide a machine for automatically making a solderless electrical connection between a deformable connector and a pair of electrical conductors.

It is another object of the invention to provide a machine for making a rapid series of electrical and mechanical connections between a series of sequentially fed deformable connectors and a plurality of conductors.

It is another object of the invention to maintain the slot contour of a centrally slotted connector during staking of the connector onto a conductor at least one notched end thereof.

These and other objects and advantages of the invention will become more apparent from the following detailed description and appended claims taken in conjunction with the accompanying drawings in which:

FIG. 3 illustrates a fragmentary front view of the machine of FIG. 1 with a connector in the staking station;

Figure 1:
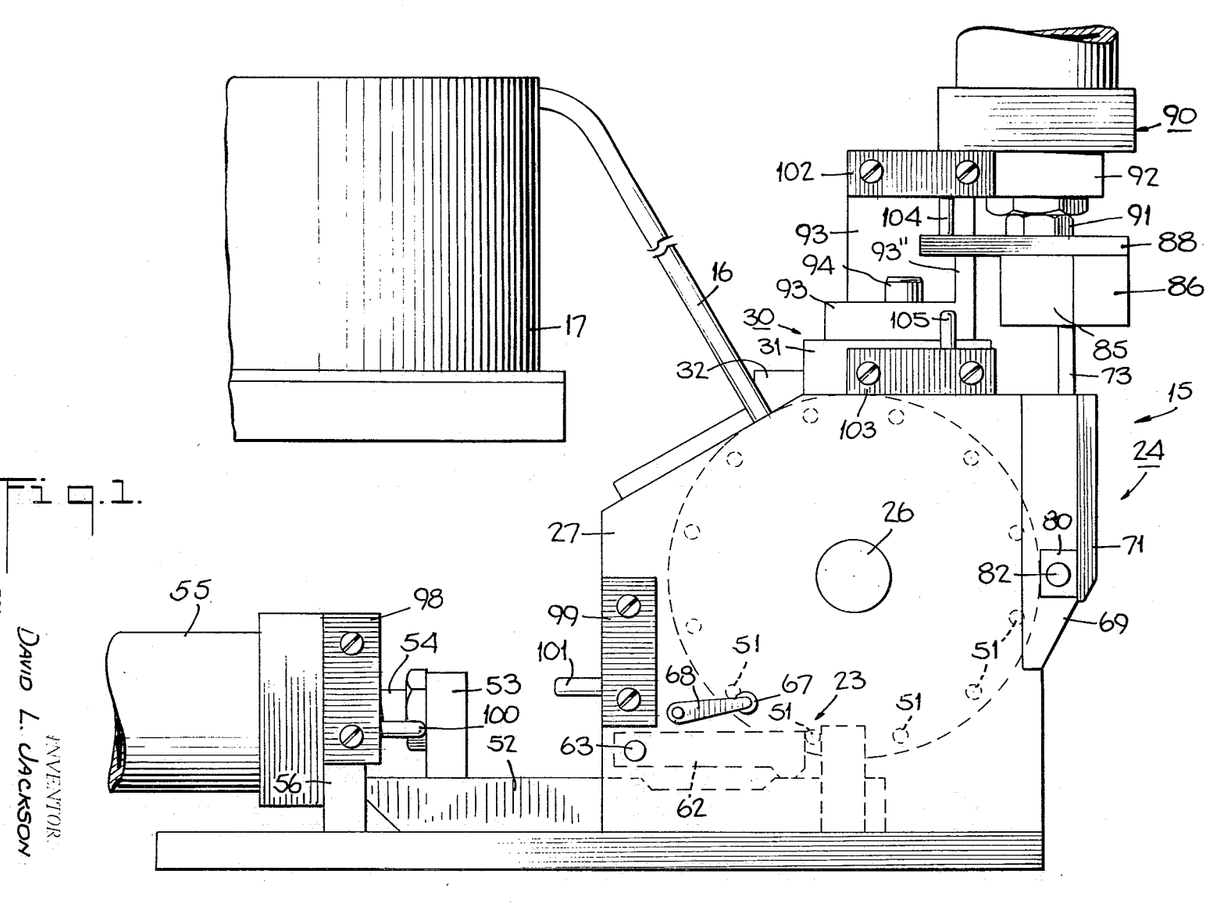
FIG. 1 illustrates a side view of a feeding and staking machine according to the invention.

Referring to FIG. 1, the feed and staking machine 15 is supplied with a series of aligned connectors through a magazine 16 mounted to the rear of the machine. The magazine 16 may be of a replaceable type so that after a series of connectors have been deposited into the machine 15 the magazine 16 can be removed for refilling while another like magazine 16 is mounted on the machine 15. Alternatively, the magazine 16 can be of a permanent type insofar as the magazine 16 can be continuously fed with connectors from a suitable source 17, for example, a sorting apparatus as disclosed in copending patent application Ser. No. 648,674 filed June 26, 1967, and now Patent No. 3,457,693.

Figures 7, 12, 13:
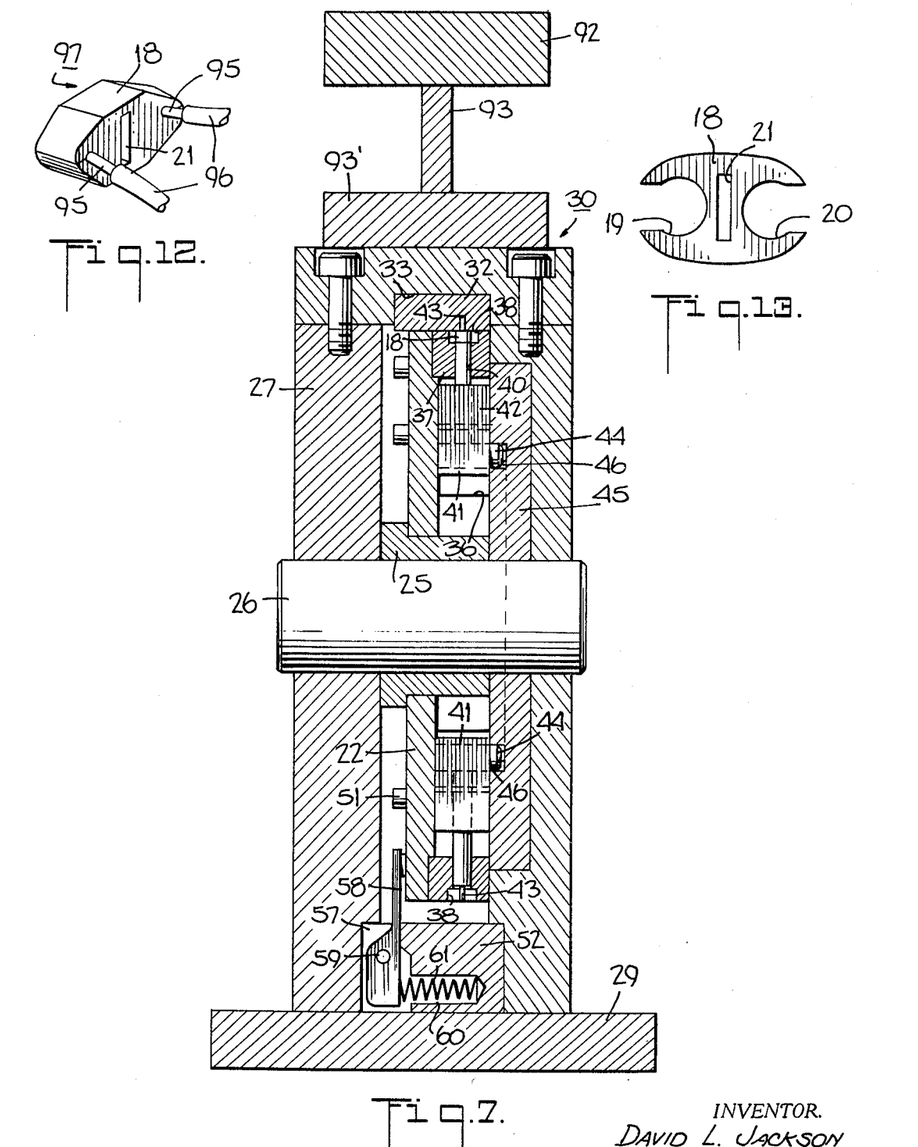
FIG. 7 illustrates a view taken on line 7—7 of FIG. 4.
FIG. 12 illustrates a perspective view of a connection formed by the machine.
FIG. 13 illustrates a view of a connector utilized by the machine.

Referring to FIG. 13, the connectors deposited into the feeding and staking machine are of the type disclosed in copending patent application, Ser. No. 555,745, filed June 7, 1966. For example, each connector 18 is formed in a generally oval shape with a pair of notches 19, 20, one at each end, and a central slot 21 disposed on axes perpendicular to the plane of the connector 18. The slot 21 can be chamfered at each end to facilitate mounting of a tab therein. The connector 18 can be made of a material such as a sintered powder metal which has a compressive-tensile loading characteristic determined by a degree of ductility which enables the connector to be crimped about each notch 19, 20 to close each notch upon being subjected to a compressive load directed substantially in alignment with the common axis of the notches 19, 20 and a degree of frangibility which enables the connector to be compressed centrally between the notches 19, 20 to initially open each notch upon being subjected to a compressive load directed substantially perpendicular to the common axis of the notches 19, 20 between the notches and to be shattered upon being subjected to a subsequent compressive load directed substantially perpendicular to the common axis of the opened notches 19, 20 therebetween. Alternatively, the connector 18 can be made of a material which has a loading characteristic which only enables the connector to close around the notches 19, 20 upon being subjected to a compressive crimping load applied substantially in alignment with the common axis of the notches 19, 20.

Referring again to FIG. 1, magazine 16 deposits each connector sequentially into an index wheel 22 rotatably mounted within the machine 15. The index wheel 22 is indexed to rotate in a clockwise manner as viewed in FIG. 1 by an index system 23 so as to bring each deposited connector to a staking station at the front of the machine 15. A staking assembly 24 is mounted at the front of the machine 15 to crimp the connector onto a pair of conductors. The staking assembly 24 and index system 23 are in synchronism with each other to effect crimping of a connector after the index wheel 22 has been advanced clockwise.

Figure 4:
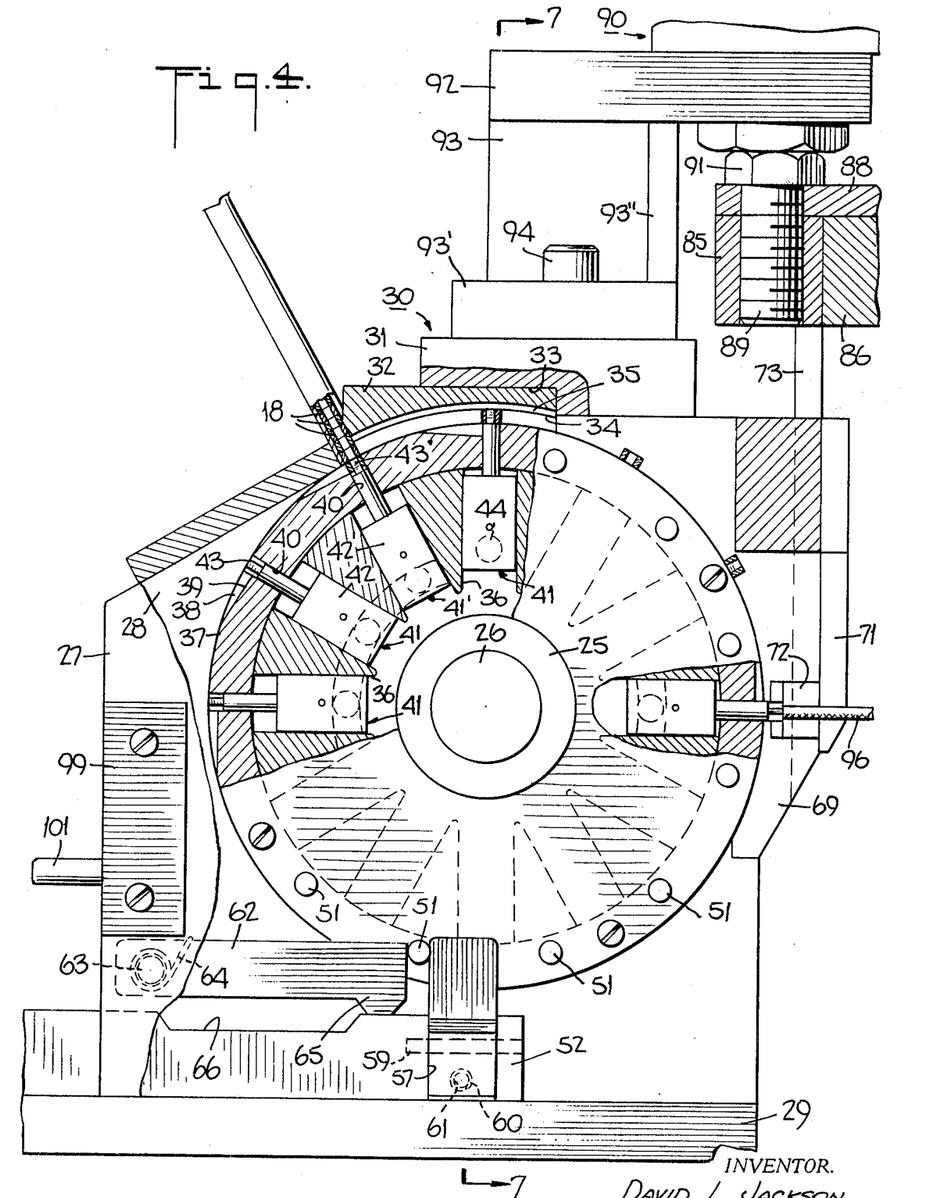
FIG. 4 illustrates a view taken on line 4—4 of FIG. 2 of the index wheel and mandrels.
Figures 5, 6:
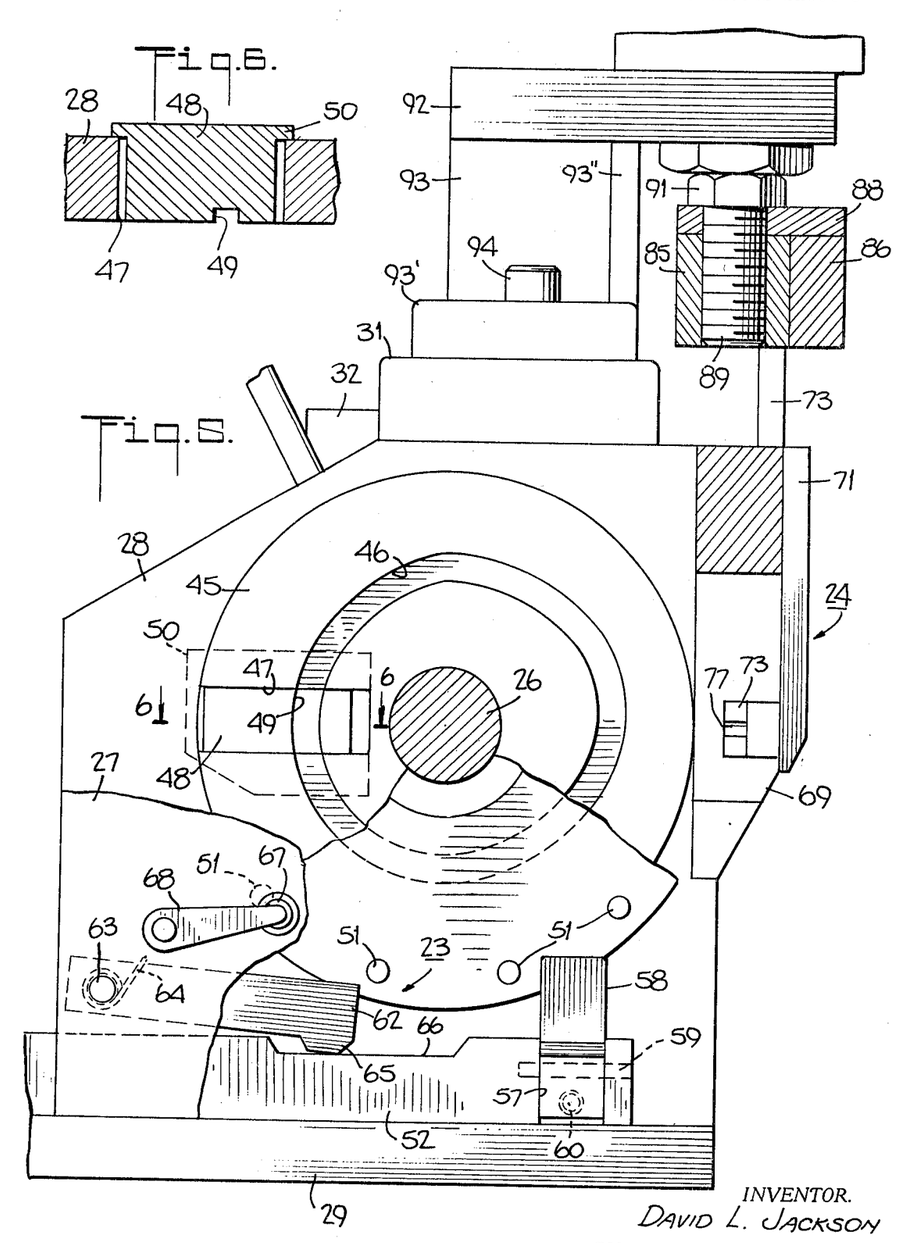
FIG. 5 illustrates a fragmentary view taken on line 5—5 of FIG. 3 of an index system for the index wheel and a cam groove for the mandrels.
FIG. 6 illustrates a view taken on line 6—6 of FIG. 5 of an access opening and cam insert plate.

Referring to FIGS. 4, 5 and 7, index wheel 22 is fixed on a bushing 25 which is journalled on a stationary shaft 26 mounted within and between a pair of side plates 27, 28. The side plates 27, 28 are fixed to a base plate 29 at the bottom as by bolts (not shown) and are bridged by a shroud assembly 30 at the top in order to cover the index wheel 22 along the topmost surface from a point substantially adjacent the magazine 16 (FIG. 4) to a point beyond the topmost point of the index wheel.

The shroud assembly 30 includes a flat plate 31 bolted to the side plates 27, 28 and a formed plate 32 which is fastened as by bolts (not shown) within a recess 33 in flat plate 31. The formed plate 32 projects from flat plate 31 toward the mounting position of the magazine 16 and has a lower curved surface 34 conforming to the contour of the index wheel periphery. In addition, the formed plate 32 has a longitudinal slot 35 in the lower curved surface 34 for a purpose hereinafter described.

Referring to FIGS. 4 and 7, index wheel 22 is provided with a plurality of circumferentially spaced recesses 36 to one side of the wheel. Each recess 36 is open with respect to the adjacent side plate 28 and with respect to a radially outward direction. A ring 37 is press-fitted or otherwise secured to the index wheel 22 about the periphery of recesses 36 so as to close off the recesses radially. The ring 37 is formed with a series of circumferentially spaced grooves 38 in the outer radial surface, each of which is disposed over a recess 36 in the index wheel 22. Each groove 38 is substantially as deep as the thickness of a connector 18, e.g. 3/32 inch, at one end and is formed with a base 39 which intersects with the peripheral surface of the ring 37 at the other end. Additionally, each groove is substantially as wide as a connector 18. The ring 37 has holes 40 passing radially through the ring 37 to communicate each groove 38 with a recess 36 radially inwardly of the groove. A mandrel assembly 41 is slidably positioned in each recess 36 around the circumference of the index wheel. Each mandrel assembly 41 includes a block 42 which is sized to be guided by the walls of a recess 36, a mandrel 43 which extends from the block 42 through a hole 40 in ring 37 into a groove 38 and a cam follower 44 which extends from the block 41 toward side plate 28. The mandrel 43 is sized at the free end with a rectangular cross sectional shape to extend into the central slot 21 of a connector 18 with a relatively close fit. In order to facilitate entry into a connector 18, the tip of the mandrel 43 is chamfered on all four sides.

Referring to FIGS. 5 and 7, side plate 28 is provided with a cam ring 45 which is set into the inside of the side plate 28 in facing relation to the index wheel 22. The cam ring 45 has a cam groove 46 formed therein into which each cam follower 44 of each mandrel assembly 41 projects. The cam groove 46 is sized with respect to the cam followers 44 to cause the mandrel assemblies 41 to reciprocate within the recesses 36 relative to ring 37. The cam groove 46 is formed with opposite working edges so as to move each mandrel assembly 41 from an innermost position at a point substantially coincident with the point at which the magazine 16 deposits the connectors 18 into the index wheel 22 to an outermost position at a point coincident with the staking station at the front of the machine 15.

Referring to FIGS. 5 and 6, the side plate 28 is formed with a passageway 47 which is positioned within the plane of index wheel 22 and sized to permit insertion or removal of a mandrel assembly 41 through the side plate 28 into or from the index wheel. The passageway 47 is closed off by a cam insert 48 which has a cam groove 49 coincident with cam groove 46 in cam ring 45 to form a continuous cam groove. In addition, the cam insert 48 is formed in a T-shaped manner with an enlarged flange 50 which is secured, as by bolts, to the exterior of side plate 28.

Referring to FIGS. 1, 4 and 7, index system 23 cooperates with a series of circumferentially spaced chamferfaced dowel pins 51 secured on index wheel 22 to rotate index wheel 22 in a clockwise manner as viewed in FIG. 4. The pitch of dowel pins 51 corresponds with the pitch of the mandrel assemblies 41 so that each movement of the index wheel brings the next mandrel assembly under magazine 16 or into the staking position. The index system 23 includes a slide 52 slidably mounted on base plate 29 between side plates 27, 28 both of which are recessed to guide the slide 52. The slide 52 has a mounting block 53 secured thereon in which a reciprocal piston 54 of a cylinder assembly 55 is mounted, as by threading. The cylinder assembly 55 is suitably mounted on the base plate 29 by a mounting block 56 to the rear of the slide 52. The slide 52 has a side recess 57 near the forward end in which a vertical plate 58 is pivotally mounted as by pin 59. The plate 58 has a thinned section which extends upwardly from slide 52 into the projected path of the dowel pins 51 of index wheel 22. In addition, a bore 60 is formed in slide 52 within recess 57 to contain a compression spring 61 which spring biases the upper section of plate 58 toward the index wheel 22 and against the slide 52.

The index system 23 also includes a lever 62 which is pivotally mounted on a pin 63 secured in side plate 27 and spring biased by a spring 64 about pin 63 toward the slide 52. The free end of lever 62 has a depending chamfered tang 65 which contacts slide 52 and which is sized to project into a chamfered groove 66 disposed in the upper surface of slide 52. The lever 62 cooperates with the slide 52 and plate 58 to act as a stop for the dowel pins 51 of the index wheel 22 upon completion of an indexing stroke by the slide 52 as well as a lock to retain the index wheel in position.

Additionally, a kick-back pin 67 (FIG. 7) is mounted in the side plate 27 to project into the path of the dowel pins 51 at a position downstream of lever 62. The pin 67 is secured to one end of a spring 68 which is fixed at the other end to the exterior of side plate 27 (FIG. 5) and is provided with a chamfered end to permit passage of the dowel pins 51 in a clockwise direction as viewed in FIG. 4.

Figure 2:
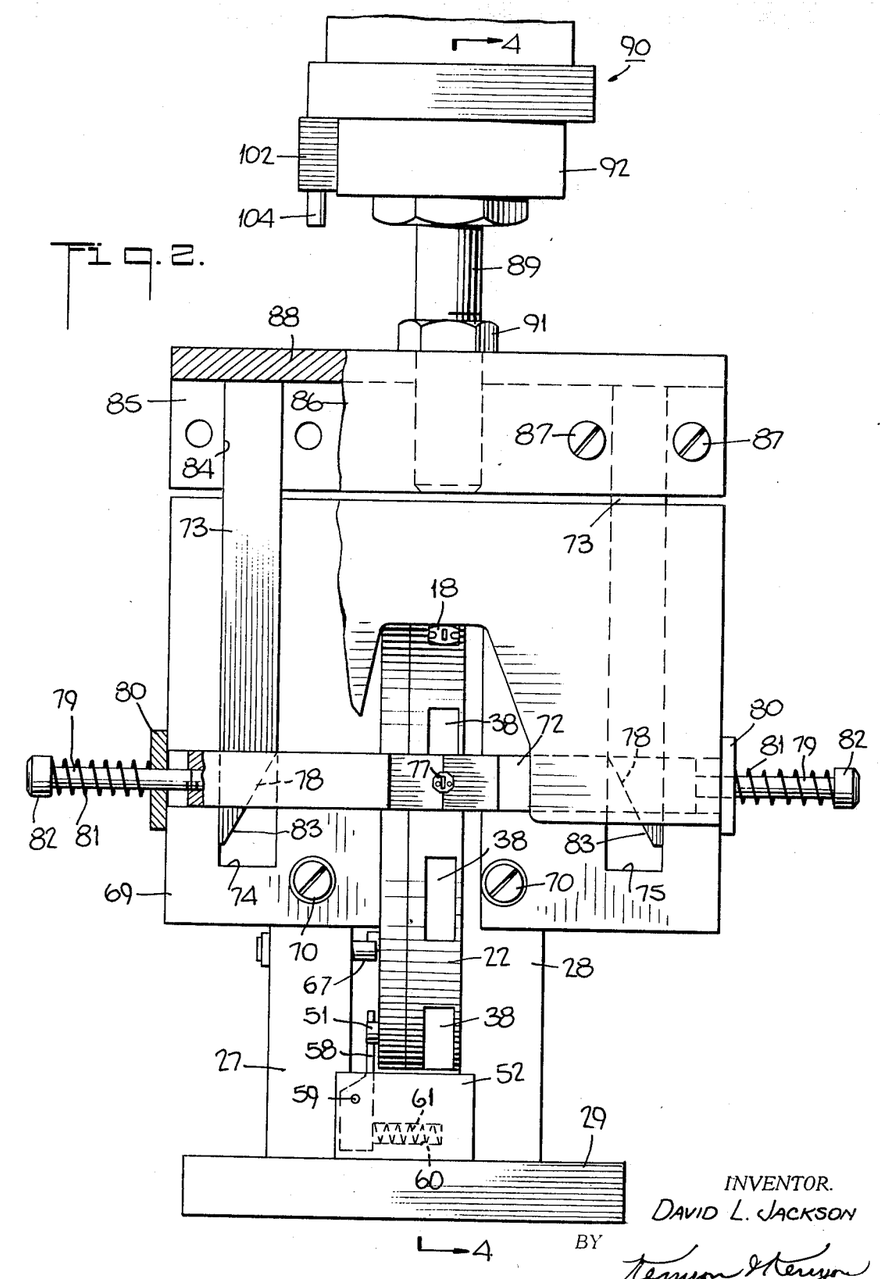
FIG. 2 illustrates a front view of the machine of FIG. 1.

Referring to FIGS. 1, 2 and 4, the staking assembly 24 is mounted on the shroud assembly 30 to extend in front of the machine 15. The staking assembly 24 includes a guide plate 69 secured by bolts 70 to the front of side plates 27, 28, a cover plate 71 secured to the face of guide plate 69, a pair of staking jaws 72 slidably positioned between the guide plate 70 and cover plate 71, and a pair of cam blades 73 for moving the staking jaws 72 toward the connector 18 in the staking station.

The guide plate 69 is formed with a pair of cruciform grooves 74, 75 which receive and guide the staking jaws 72 and cam blades 73 in cross-wise manner. Each staking jaw 72 is formed with a reduced forward end 76 which has a staking groove 77 in the face thereof. The staking groove 77 is formed, for example, in a semi-hexagonal shape, to be complementary to the staking groove of the opposed staking jaw 72. In addition, each staking jaw 72 has a sloped edge 78 near the end opposite the forward end 76 and is secured to a headed pin 79 which extends outwardly of guide plate 69. The headed pin 79 passes through a washer 80 abutting the guide plate 69 and through a compression spring 81 between the washer 80 and head 82 so as to be biased outwardly of the guide plate 69. Each cam blade 73 is formed with a sloped forward end 83 which is complementary to the sloped edge 78 of the staking jaw 72 and which is sized to contact the sloped edge 78 of a staking jaw 72.

The cam blades 73 are secured at the upper ends within the notches 84 of a cam blade holder 85 by a clamp plate 86 secured, as by bolts 87, to the cam blade holder 85. In addition, a cam cover adjusting plate 88 is secured to the cam blade holder 85 and clamp plate 86 to form a weighted unit. A reciprocal piston 89 of a cylinder assembly 90 is secured as by threading in the cam blade holder 85 and passes through the adjusting plate 88 and a lock nut 91. The cylinder assembly 90 includes a mounting plate 92 which is secured by means of plates 93, 93', 93" and bolts 94 to the flat plate 31 of shroud assembly 30.

Figure 8:
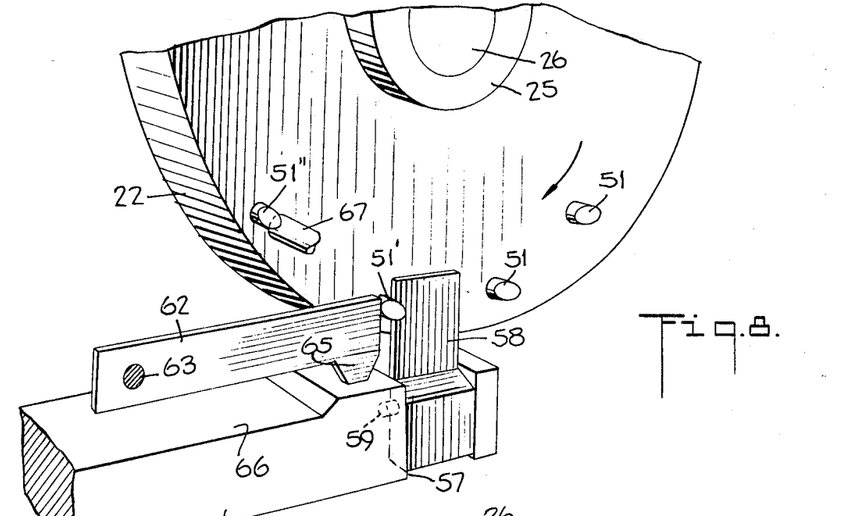
FIG. 8 illustrates a perspective view of the index wheel and index system prior to indexing of the index wheel.
Figure 9:
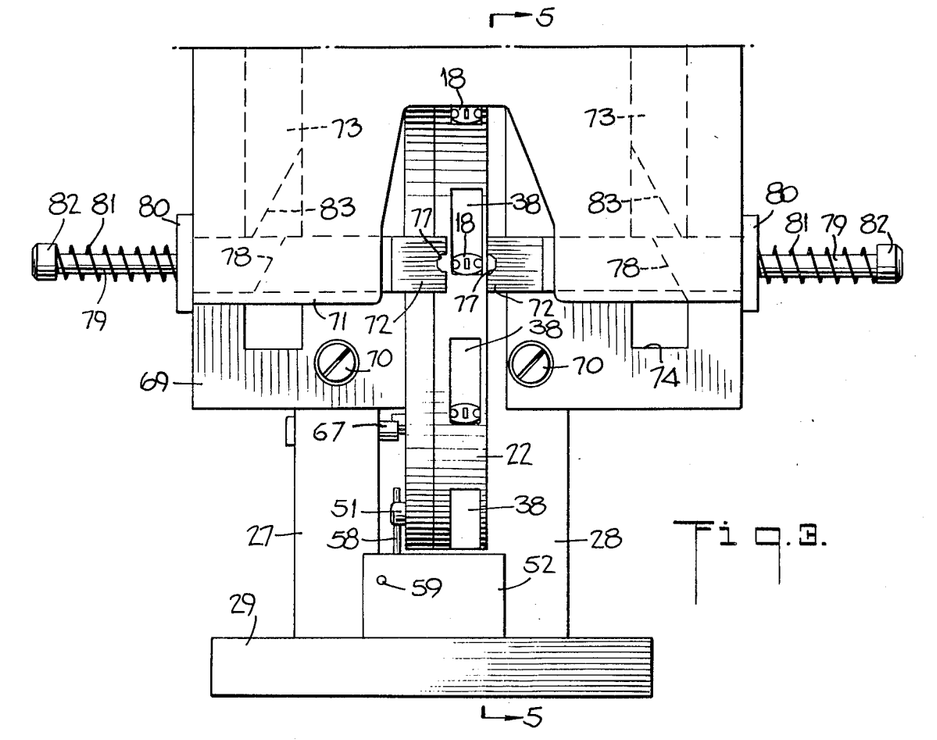
FIG. 9 illustrates a perspective view of the index wheel and index system after indexing of the index wheel.

The operation of the machine 15 is described in the following. Referring to FIG. 4, with the magazine 16 in place on the machine 15, a connector 18 is deposited into the deep end of groove 38 in a position to permit the mandrel 43 of a mandrel assembly 41 to pass through the central slot 21 in the connector 18. Next, referring to FIGS. 8 and 9, the slide 52 of the index system 23 moves toward the front of the machine 15 due to the movement of piston 54 out of cylinder assembly 55. During this movement the spring biased plate 58 initially contacts the chamfered face of the dowel pin 51' in the path of the plate 58 and then slides over the dowel pin 51' while pivoting on pin 59 away from the dowel pin 51'. Upon passing by the dowel pin 51', the plate 58 springs back behind the dowel pin 51' under the bias of spring 60. At the same time as the slide 52 moves toward the front of the machine 15, lever 62 drops into the groove 66 in the slide 52 under the spring biasing force of spring 64. The slide 52 then returns toward the back of the machine 15 as the piston 54 retracts into cylinder assembly 55 with the plate 58 pushing the dowel pin 51'. This causes the index wheel 22 to rotate in a clockwise manner as viewed in FIG. 8 toward the connector receiving station. As the index wheel 22 rotates, dowel pin 51" moves over the lever 62 while the lever 62 is in the groove 66. Upon passing of the dowel pin 51", lever 62 is pivoted upwardly under the force of the silde 52 by means of the chamfered wall of groove 66 to again project into the path of the dowel pins 51. The slide 52 continues to move until dowel pin 51' abuts the lever 62. Dowel pin 51' is then locked in place between lever 62 and plate 58 (FIG. 9). As the index wheel 22 rotates, the dowel pin 51''' nearest the kickback pin 67 in the sense of rotation moves against the chamfered end of the pin 67 to force the pin 67 outwardly of the machine. This permtis dowel pin 51''' to pass by the kick-back pin 67. When the index wheel 22 is brought to a stop, the dowel pin 51''' is positioned on the side of the pin 67 remote from dowel pin 51" in contact with pin 67. Since the kick-back pin 67 and dowel pin 51''' have abutting walls perpendicular to index wheel 22, the index wheel 22 is prevented from rotating, or kicking back, in a counterclockwise direction as viewed in FIG. 9 especially during forward movements of slide 52.

The index wheel 22 is repeatedly indexed in the above described manner until the received connector 18 is moved to the staking position.

Referring to FIGS. 4, 5 and 7, as the index wheel 22 rotates, the mandrel assembly 41' which receives the deposited connector under magazine 16 is moved radially of the index wheel 22 through the cam follower 44 positioned in the cam groove 46 in cam ring 45. Initially, the mandrel assembly 41' is positioned under the magazine 16 so that mandrel 43' projects into the groove 38' a sufficient amount to pass into the slot 21 of the deposited connector 18. Thereafter, as the index wheel 22 rotates, the connector 18 moves under the formed plate 32 while the mandel assembly 41' begins to move radially outwardly of the index wheel 22. As the mandrel assembly 41' moves radially, the mandrel 43' passes completely through the connector 18 into the groove 35 of formed plate 32 while the connector 18 is slidably confined between the shroud assembly 30 and index wheel 22. Upon continued rotation of index wheel 22, the mandrel assembly 41' moves radially outwardly until reaching the staking station. Upon reaching the staking station, the connector 18 on mandrel 43' is in a position centrally between the opened staking jaws 72 of the staking assembly 24 (FIG. 4).

Continued rotation of index wheel 22 allows the mandrel assembly 41 at the staking station to be moved radially inwardly under the influence of cam groove 46 until reaching the position under magazine 16.

Figure 10:
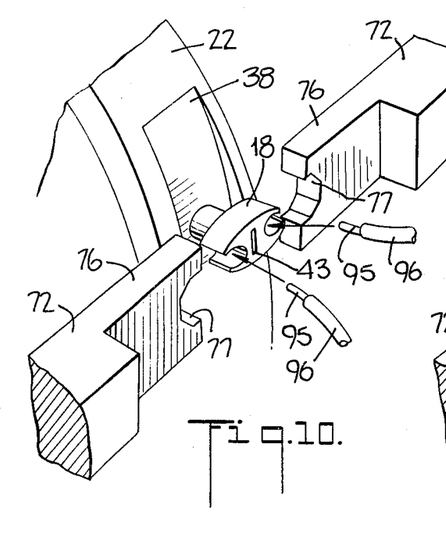
FIG. 10 illustrates a perspective view of a connector and the staking jaws in the staking station prior to staking onto a pair of conductors.
Figure 11:
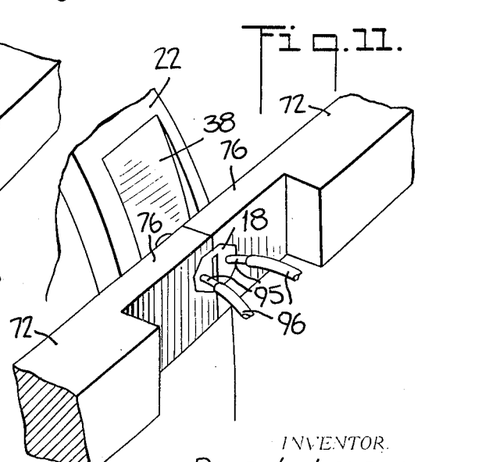
FIG. 11 illustrates a perspective view of a connection and the staking jaws in staking position.

Refering to FIGS. 2, 3, 10 and 11, when a connector 18 is brought into the staking station, the staking jaws 72 are in an open position. Thereafter, with the index wheel 22 stopped in a locked position by virtue of the index system 23 and pin 67, the bared wire ends 95 of a pair of conductors 96 are inserted into the notches 19, 20 of the connector 18 (FIG. 10). Next, the cylinder assembly 90 is actuated to move piston 89 and, consequently, the cam blades 73 downwardly. As the cam blades 73 move downwardly, the sloped forward ends 83 move along the sloped edges 78 of the staking jaws 72 to cause the staking jaws to close on the connector 18 (FIG. 11). As the staking jaws 72 close on the connector 18, the walls of the notches 19, 20 are crimped over the wire ends 95 to firmly secure the wire ends within the connector 18 to form an electrical and mechanical connection. During this time, the connector 18 is subjected to compressive forces substantially parallel to the common axis of notches 19, 20 which deform the connector 18 from the original ovate shape to the contour of the staking grooves 77, i.e., a generally hexagonal shape. Also, during this time, the mandrel 43 remains in slot 21 so as to maintain the contour of the slot 21.

After a pair of conductors 96 have been staked within a connector 18, the piston 89 moves upwardly causing the cam blades 73 to do likewise. This allows the springs 81 to move the pins 79 and staking jaws 72 outwardly to open the staking jaws 72. The formed connection is then removed, e.g. manually. Thereafter, the index wheel 22 is indexed to bring another connector 18 into the staking station for repeated operations.

Referring to FIG. 12, a connection 97 formed by the machine includes a connector 18 having a central slot 21, e.g. for connection to a tab (not shown) of an electrical system, and a pair of electrical conductors 96 electrically and mechanically secured therein.

While the feeding and staking machine of the invention is capable of manual operation, it is intended to operate the machine automatically. In this latter regard, the machine 15 can be operated through an electrical system. For example, referring to FIG. 1, the index system 23 is provided with a pair of spaced switches 98, 99, one of which is mounted on mounting block 56 with a switch actuating lever 100 in the path of the mounting block 53 of slide 52 and the other of which is mounted on side plate 27 with a switch actuating lever 101 in the path of the mounting block 53. Similarly, the staking assembly 24 is provided with a pair of spaced switches 102, 103, one of which is mounted on the mounting plate 92 with a switch actuating lever 104 in the path of the adjusting plate 88 of cam blades 73 and the other of which is mounted to the shroud assembly 30 with a switch actuating lever 105 in the path of the adjusting plate 88.

Figure 14:
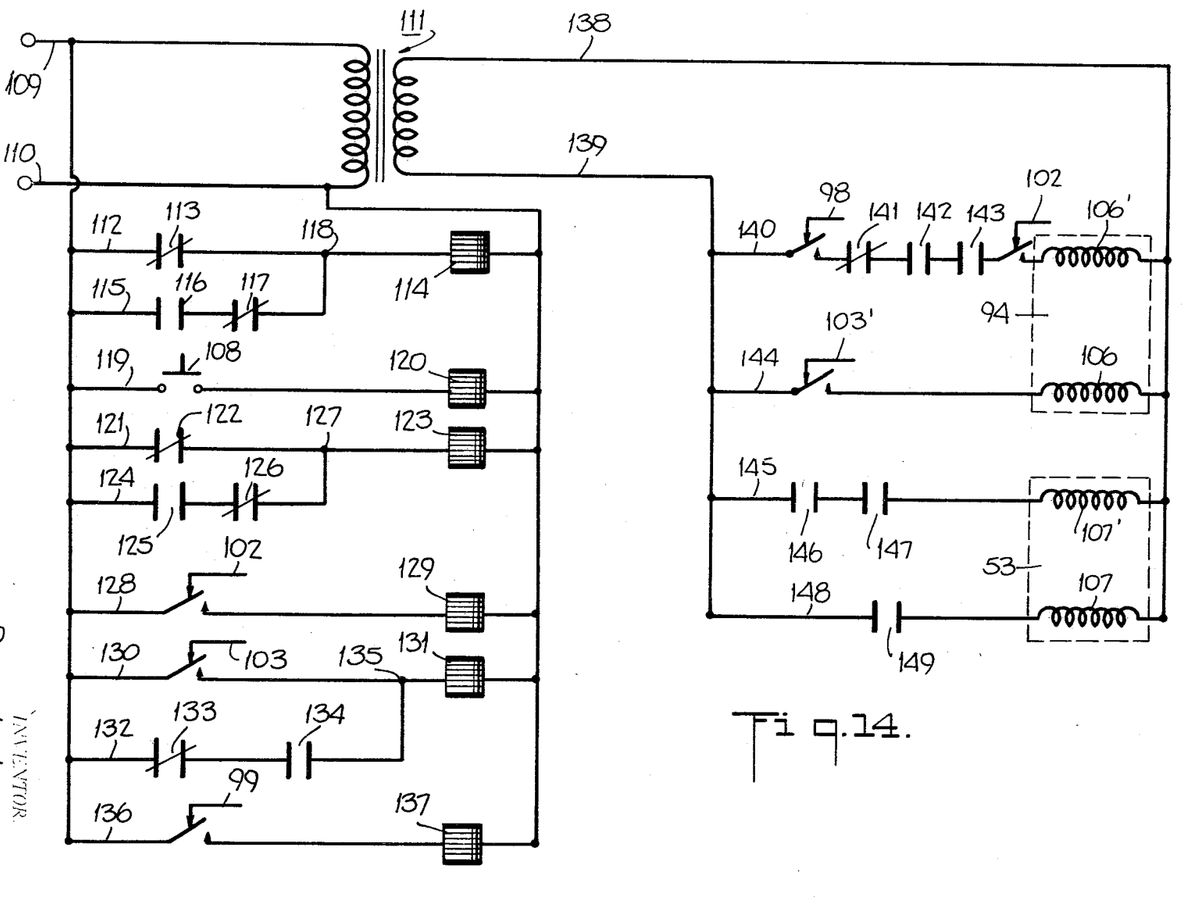
FIG. 14 schematically illustrates an electrical circuit of the machine of the invention.

Referring to FIG. 14, the electrical circuit in which the switches 98, 99, 102, 103 are connected also connects to a pair of coils 106, 106', 107, 107' in each cylinder assembly 90, 55 of the respective staking assembly 24 and index system 23. In this regard, it is noted that the cylinder assemblies 90, 55 are of the type wherein the respective pistons 89, 54 are reciprocated upon energization of each respective coil. The electrical circuit also includes a manual on-off switch 108 for actuating the circuit to enable the machine 15 to perform the functions of feeding and staking.

The electrical circuit has power lines 109, 110 connected to a power source (e.g. a 120 volt, 60 cycle source). In addition, a transformer 111 of a step down type (e.g. 10 volts, 60 cycles) is connected to the circuit to connect the cylinder assemblies 55, 90 into the circuit. A line 112 having a normally closed relay contact 113 and a relay 114 is connected across the power lines. Line 115 having a normally open relay contact 116 and a normally closed relay contact 117 connects between power line 109 and terminal 118 in line 112. Line 119 containing manual switch 108 and relay 120 and line 121 having a normally closed relay contact 122 and relay 123 connect between the power lines. Line 124 having normally open relay contact 125 and normally closed relay contact 126 connects between power line 109 and terminal 127 in line 121. Line 128 having switch 102 and relay 129 and line 130 having switch 103 and relay 131 connect between the power lines. Line 132 having normally closed relay contact 133 and normally open relay contact 134 connects between power line 109 and terminal 135 in line 130. Line 136 having switch 99 and relay 137 connects between the power lines.

Additionally, the power lines 138, 139 of transformer 111 have a line 140 having switches 98, 102, normally closed relay contact 141, normally open relay contacts 142, 143, and coil 106' connected thereacross. Line 144 having switch 103 and coil 106, line 145 having normally open relay contacts 146, 147 and coil 107, and line 148 having normally open relay contact 149 and coil 107' between the power lines 138, 139 complete the circuit.

Before switch 108 is closed, the piston 89 of the staking assembly 24 and the piston 54 of the index system 23 are in retracted positions while the index wheel 22 has a groove 38' positioned under magazine 16 and a mandrel assembly 41 positioned at the staking station. Also, the switches 98 and 102 are closed.

Upon closing of switch 108, relay 120 is activated to open contact 113 and close contact 143. Relay 114 remains activated through contacts 116 and 117, thereby holding contact 142 closed. The closing of contact 143 allows coil 106' to be energized. As coil 106' is energized, piston 86 is caused to move downwardly together with the cam blades 70. As piston 86 moves downwardly, switch 102 is opened thereby de-energizing coil 106'.

Simultaneously, as switch 102 opens, relay 129 becomes deactivated causing contact 122 to close and contact 147 to open. As contact 122 closes, relay 123 becomes activated causing contacts 125 and 146 to close. Contact 125 permits relay 123 to be maintained in an activated state.

As the point at which staking jaws 72 close on each other, plate 88 causes lever 105 to close switch 103'. This energizes coil 106 to return piston 89 toward cylinder assembly 90.

Further, as switch 103 closes, relay 131 is activated to open contacts 117 and 141 and close contacts 134. Opening of contact 117 deactivates relay 114 and consequently opens contacts 116 and 142. Closing of contact 134 maintains relay 131 in an activated state.

Upon the return of piston 98 to cylinder assembly 90, switch 102 now closes activating relay 129. With relay 129 activated contact 122 opens and contact 147 closes energizing coil 107'. With coil 107' energized piston 54 is caused to move outwardly of cylinder assembly 55. Thus, slide 52 moves toward the front of the machine.

As slide 52 moves to its outermost extent, it causes block 53 to trip lever 101 causing switch 99 to close. When switch 99 closes, it activates relay 137 which opens contacts 133 and 136. At the same time it closes contact 149. With the opening of contacts 133 and 136, relays 123 and 131 become activated. Contacts 125 and 134 open and contacts 117 and 141 close. When contact 149 closes, coil 107 becomes energized and causes piston 54 to retract toward cylinder assembly 55.

Meanwhile, since relay 131 is maintained activated, contact 141 is held open and coil 106' cannot be energized until piston 54 has retracted to cylinder assembly 55 and caused switch 98 to close.

With the closing of switch 98 by piston 54, the circuit completes one cycle and is now in condition for recycling.

The invention provides a feeding and staking machine which is capable of rapidly making a great number of electrical connections between the feed connectors and conductors, for example, up to 5000 connections per eight hour day. The machine further makes a reliable solderless electrical and mechanical connection between the connector as described above and the conductors inserted therein.

It is to be noted that while the staking jaws of the machine have been described as having hexagonal staking grooves it is contemplated that other shaped staking grooves can be used depending upon the connector to be crimped.

Having thus described the invention, it is not intended that it be so limited as changes may be readily made therein without departing from the scope of the invention. Accordingly, it is intended that the foregoing Abstract of the Disclosure, and the subject matter described above and shown in the drawings be interpreted as illustrative and not in a limiting sense.

What is claimed is:

1. A feeding and staking machine for electrical connectors comprising a rotary means for receiving a connector, said rotary means including a rotatably mounted index wheel disposed in a vertical plane, at least one mandrel assembly radially slidably mounted in said index wheel for receiving a connector thereon, and means for moving said mandrel assembly radially of said index wheel,     index means for indexing said rotary means between a connector receiving station and a staking station, and staking means disposed at said staking station for staking a connector received on said rotary means to at least one electrical conductor to form an electrical connection therebetween.

2. A feeding and staking machine as set forth in claim 1 wherein said means for moving said mandrel assembly includes a cam ring positioned adjacent said index wheel, said cam ring having an annular cam groove therein, and a cam follower projecting from said mandrel assembly into said cam groove in slidable relation thereto whereby movement of said cam follower annularly of said cam groove causes radial movement of said mandrel assembly relative to said index wheel.

3. A feeding and staking machine as set forth in claim 1 wherein said index wheel includes at least one groove in the periphery thereof to receive a connector therein, said mandrel assembly having a mandrel therein projecting into said groove of said index wheel to pass through the recived connector.

4. A feeding and staking machine as set forth in claim 1 wherein said index means includes a reciprocally mounted slide adjacent said rotary means, and means mounted on said slide for releasably engaging said rotary wheel to index said rotary wheel simultaneously with movement of said slide in one direction.

5. A feeding and staking machine for electrical connectors comprising
a rotary means for receiving a connector and having a plurality of dowel pins mounted therein,
index means for indexing said rotary means between a connector receiving station and a staking station, said index means including a reciprocally mounted slide having a first means pivotally mounted thereon projecting into the path of said dowel pins, said first means engaging one of said dowel pins during movement of said slide in one direction to index said rotary means towards said one direction, and
staking means disposed at said staking station for staking a connector received on said rotary means to at least one electrical conductor to form an electrical connection therebetween.

6. A feeding and staking machine as set forth in claim 5 wherein said first means is spring biased in a direction toward said rotary means.

7. A feeding and staking machine as set forth in claim 5 wherein said index means further includes a pivotally mounted lever disposed above said slide for projecting into the path of said one dowel pin during movement of said slide in said one direction whereby said one dowel pin is locked between said lever and first means upon completion of the movement of said slide in said one direction.

8. A feeding and staking machine as set forth in claim 7 wherein said slide has a groove intermediately thereof and said lever is mounted to move out of the path of said one dowel pin into said groove during movement of said slide in an opposite direction.

9. A feeding and staking machine as set forth in claim 5 wherein said index means further includes a kick-back pin projecting into the path of said dowel pins on said rotary means downstream of said first means, said kick-back pin having a sloped face in facing relation to the path of said dowel pins; and a spring secured to said kick-back pin biasing said kick-back pin into said path of said dowel pins and permitting said kick-back pin to move out of said path upon passage of a dowel pin therby during indexing of said rotary means in said one direction.

10. A feeding and staking machine for electrical connectors comprising
a rotary means for receiving a connector,
index means for indexing said rotary means between a connector receiving station and a staking station, and
staking means disposed at said staking station for staking a connector received on said rotary means to at least one electrical conductor to form an electrical connection therebetween, said staking means including a pair of oppositely disposed staking jaws and means for moving said staking jaws between a first position wherein said staking jaws contact each other to crimp the connector positioned therebetween onto the electrical conductor in said staking station and a second position wherein said staking jaws are in spaced relation.

11. A feeding and staking machine as set forth in claim 10 wherein each said staking jaw has a staking groove in a face opposed to the other staking jaw to receive the connector in said staking station.

12. A feeding and staking machine as set forth in claim 11 wherein each said staking groove is semi-hexagonal in shape.

13. A feeding and staking machine as set forth in claim 10 wherein said means for moving said staking jaws includes a pair of reciprocally mounted cam blades, each cam blade being in slidable contact with one of said staking jaws for moving said one staking jaw toward the other staking jaw upon movement of said cam blades in a direction toward said staking jaws; a pair of pins, each pin being secured to a staking jaw and projecting outwardly therefrom; and a pair of springs, each spring biasing one of said pins outwardly of said staking jaws for moving said staking jaws apart upon movement of said cam blades in a direction away from said staking jaws.

14. A feeding and staking machine as set forth in claim 1 further comprising actuating means for actuating said index wheel means and said staking means in synchronism with each other to sequentially feed and stake a series of connectors to and in said staking station.

15. A feeding and staking machine as set forth in claim 14 wherein said actuating means includes an electrical circuit.

16. A feeding and staking machine for crimping a series of connectors onto pairs of conductors comprising
a rotatable index wheel having a plurality of circumferentially spaced peripheral grooves therein for receiving the connectors sequentially therein;
a plurality of mandrel assemblies reciprocally mounted in said index wheel, each said mandrel assembly having a mandrel projecting into one of said grooves in said index wheel and a cam follower projecting out of said index wheel;
a stationary cam ring positioned adjacent said index wheel having a cam groove therein receiving each cam follower of said plurality of mandrel assemblies for moving each mandrel assembly radially reciprocally of said index wheel to position a received connector in said staking station;
an index means for indexing said index wheel about the axis thereof between a connector receiving station and a staking station, said index means having reciprocating means for releasably engaging said index wheel upon movement in a first direction toward said connector receiving station; and
staking means at said staking station for staking the connector therein to a pair of conductors inserted in the connector to form an electrical connection.

17. A feeding and staking machine as set forth in claim 16 wherein said index wheel includes a plurality of circumferentially spaced dowel pins projecting axially thereof, said reciprocating means of said index means projecting into the path of movement of said dowel pins.

18. A feeding and staking machine as set forth in claim 17 wherein said index means further has a kick-back pin mounted in said path of said dowel pins, said kick-back pin having a sloped face facing said dowel pins; and a spring mounting said kick-back pin thereon to bias said kick-back pin toward said index wheel into said path whereby one of said dowel pins contacts said kick-back pin oppositely of said sloped faces during movement of said reciprocating means in a direction opposite said first direction.

19. A feeding and staking machine as set forth in claim 16 wherein said index wheel includes a plurality of axially projecting circumferentially spaced dowel pins, each said pin having a sloped face facing in the direction of rotation of said index wheel; and said reciprocating means includes a slide having a plate pivotally mounted thereon and projecting into the path of said dowel pins, a spring therein biasing said plate toward said index wheel into said path of said dowel pins, and means for reciprocating said slide whereby upon movement of said slide in said one direction, said plate contacts one of said pins to rotate said index wheel toward said connector receiving station and upon movement of said slide in an opposite direction, said plate pivots away from said index wheel to pass over the next dowel pin upstream of said plate.

20. A feeding and staking machine as set forth in claim 19 wherein said slide further has a groove intermediately thereof and said index means further has a lever pivotally mounted above said slide in said path of said dowel pins, and a spring urging said lever into contact with said slide whereby upon movement of said slide in said opposite direction, said lever pivots into said groove out of said path to permit movement of a dowel pin thereby.

21. A feeding and staking machine as set forth in claim 16 wherein said staking means includes a pair of reciprocally mounted staking jaws disposed oppositely of said staking station, each said staking jaw having a staking groove therein facing the staking groove in the other staking jaw; a pair of reciprocally mounted cam blades slidably contacting said staking jaws for moving said staking jaws into contact with each other at said staking station upon movement of said cam blades in one direction; means for reciprocating said cam blades; and spring means biasing said staking jaws outwardly of said staking station for moving said staking jaws apart upon movement of said cam blades in a direction opposite said one direction.

22. A feeding and staking machine as set forth in claim 16 further comprising actuating means for actuating said index means and said staking means in synchronism with each other.

23. A feeding and staking machine as set forth in claim 21 further comprising actuating means for actuating said reciprocating means of said index means and said means for reciprocating said cam blades of said staking means in synchronism with each other.

24. A feeding and staking machine as set forth in claim 23 wherein said actuating means includes a first cylinder assembly connected to said reciprocating means to reciprocate said reciprocating means; a second cylinder assembly connected to said means for reciprocating said cam blades to reciprocate said means; and an electrical circuit for activating each said cylinder assembly in synchronism.

25. In a staking machine, the combination of a means including a mandrel assembly for receiving a connector thereon and a staking means for staking a connector received on said mandrel assembly to at least one electrical conductor to form an electrical connection therebetween, said staking means including a pair of oppositely disposed staking jaws and means for moving said staking jaws between a first position wherein said staking jaws contact each other to crimp the connector positioned therebetween onto the electrical conductor and a second position wherein said staking jaws are in spaced relation.

References Cited
UNITED STATES PATENTS

| | | |
|---|---|---|
| 1,482,687 | 2/1924 | Kraft. |
| 2,398,550 | 4/1946 | Nelson _____________ 29—243.5 |
| 3,071,174 | 1/1963 | Kerns. |

THOMAS H. EAGER, Primary Examiner

U.S. Cl. X.R.

29—208